United States Patent
Lorenz et al.

(10) Patent No.: US 12,083,759 B2
(45) Date of Patent: Sep. 10, 2024

(54) CURING MOLD ASSEMBLIES FOR NON-PNEUMATIC TIRES AS WELL AS METHODS OF MANUFACTURE

(71) Applicant: Bridgestone Americas Tire Operations, LLC

(72) Inventors: Zachary G. Lorenz, Nashville, TN (US); Steven J. Jenkins, Nashville, TN (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/559,971

(22) PCT Filed: Jun. 15, 2022

(86) PCT No.: PCT/US2022/072955
§ 371 (c)(1),
(2) Date: Nov. 9, 2023

(87) PCT Pub. No.: WO2022/266635
PCT Pub. Date: Dec. 22, 2022

(65) Prior Publication Data
US 2024/0262061 A1    Aug. 8, 2024

Related U.S. Application Data

(60) Provisional application No. 63/212,199, filed on Jun. 18, 2021.

(51) Int. Cl.
*B29D 30/02* (2006.01)
*B60C 7/10* (2006.01)

(52) U.S. Cl.
CPC .............. *B29D 30/02* (2013.01); *B60C 7/107* (2021.08)

(58) Field of Classification Search
CPC ................................ B29D 30/02; B60C 7/107
See application file for complete search history.

(56) References Cited

U.S. PATENT DOCUMENTS

| | | |
|---|---|---|
| 2014/0070448 A1 | 3/2014 | Martin et al. |
| 2015/0027606 A1 | 1/2015 | Martin |
| | (Continued) | |

FOREIGN PATENT DOCUMENTS

JP    2021030542 A    3/2021

OTHER PUBLICATIONS

International Search Report and Written Opinion dated Sep. 30, 2022 issued by KIPO in connection with corresponding International Application No. PCT/US2022/072955.

*Primary Examiner* — John J DeRusso
(74) *Attorney, Agent, or Firm* — Shaun J. Fox; Matthew P. Dugan

(57) ABSTRACT

Mold assemblies used for curing non-pneumatic tires include a mold section and curing shoe assemblies supported on the mold section. The curing shoe assemblies include an actuation cup supported on the mold section in radially-offset alignment with a mold axis. First and second curing shoes are spaced laterally from the actuation cup and are operatively connected thereto by actuation members. Fluid pressure generates movement of the actuation members away from one another, which displaces the first and second curing shoes laterally away from one another. Methods of manufacturing a non-pneumatic tire are also included.

20 Claims, 12 Drawing Sheets

(56) References Cited

U.S. PATENT DOCUMENTS

2015/0034225 A1 2/2015 Martin
2020/0376789 A1* 12/2020 Lung .................... B60C 7/18
2021/0114312 A1 4/2021 Wilson et al.

* cited by examiner

CURING MOLD ASSEMBLIES FOR NON-PNEUMATIC TIRES AS WELL AS METHODS OF MANUFACTURE

This application is the National Stage of International Application No. PCT/US2022/072955, filed on Jun. 15, 2022, which claims the benefit of priority from U.S. Provisional Patent Application No. 63/212,199, filed on Jun. 18, 2021, the entire contents of which is hereby incorporated herein by reference.

BACKGROUND

The subject matter of the present disclosure broadly relates to the art of vehicle tire manufacturing and, more particularly, to mold assemblies for curing non-pneumatic tires as well as methods of manufacturing non-pneumatic tires using such mold assemblies.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Conventional pneumatic tires include a tire casing with a tread formed on or along the exterior thereof that is configured to engage a roadway or other ground surface. The tire casing includes an annular body formed from a plurality of layers or plies (e.g., radial plies, belt plies) with opposing sidewalls that extend radially inward from along shoulder portions of the annular body to beads forming the radially-inward extent of the sidewalls. The inner surface of the annular body and the opposing sidewalls are covered by an inner liner that defines the tire chamber of a pneumatic tire.

In conventional tire manufacturing processes, an uncured tire carcass and tread assembly is loaded into a mold assembly on a tire curing press. The mold assembly includes a plurality of die segments with an inside surface portion that includes a section of a tread pattern. The mold assembly is closed by the tire curing press, which positions the die segments in abutting engagement with the tread material of the uncured tire assembly. The tire curing press also includes a curing bladder that is positioned inside the mold assembly such that the uncured tire assembly is spaced outward of the curing bladder in an uninflated condition of the curing bladder. During the curing process, the curing bladder is inflated such that the curing bladder extends into the tire chamber of the uncured tire assembly in abutting engagement with the inner liner. While under pressure from the mold assembly and the inflated curing bladder, the tire curing press introduces heat to the uncured tire assembly which vulcanizes or otherwise crosslinks the uncured tire material to form a completed tire.

Notwithstanding the wide usage and overall success of known types and kinds of tire mold assemblies and methods of manufacture, it has been recognized that certain disadvantages exist with known processes that could limit the applicability and/or use thereof in connection with the manufacture of tire assemblies having other structural arrangements, such as so-called non-pneumatic tires, for example. Accordingly, it is believed desirable to develop mold assemblies and methods of manufacture that may aid in overcoming the foregoing and/or other problems and/or disadvantages of known techniques, and/or otherwise advance the manufacture of non-pneumatic tires.

BRIEF DESCRIPTION

One example of a method of manufacturing a non-pneumatic tire in accordance with the subject matter of the present disclosure can include supporting a curing shoe assembly on a first mold section that has a longitudinal-extending mold axis. The curing shoe assembly can include an actuation cup supported on the first mold section such that the actuation cup is disposed in radially-offset alignment with the mold axis. The actuation cup can include a cup wall that at least partially defines a cup chamber. A first actuation member can extend between a first member end and a second member end. The first actuation member can extend through and/or can be operatively supported on the cup wall such that the first member end thereof is disposed within the cup chamber. The first actuation member can be translatable along a first member axis that is oriented transverse to the mold axis. A second actuation member can extend between a first member end and a second member end. The second actuation member can extend through and/or can be operatively supported on the cup wall such that the first member end thereof is disposed within the cup chamber. The second actuation member can be translatable in along a second member axis that is oriented transverse to the mold axis and disposed at an acute included angle relative to the first member axis. A first curing shoe can be supported on the second end of the first actuation member, and a second curing shoe can be supported on the second end of the second actuation member in spaced relation to the first curing shoe. The method can also include providing a less-than-fully-cured non-pneumatic tire assembly that includes a plurality of support structures disposed in peripherally-spaced relation to one another and a plurality of spaces disposed in peripherally-spaced relation to one another with one of the plurality of spaces between adjacent ones of the plurality of support structures. The method can further include positioning the less-than-fully-cured non-pneumatic tire assembly along the first mold section such that the curing shoe assembly is disposed within one of the plurality of spaces and axially coextensive with the less-than-fully-cured non-pneumatic tire assembly. The method can also include applying fluid pressure to the first end of the first and second actuation members thereby displacing the first and second curing shoes laterally away from one another into engagement with and applying pressure to the less-than-fully-cured non-pneumatic tire assembly. The method can further include curing the non-pneumatic tire assembly.

One example of a mold assembly in accordance with the subject matter of the present disclosure, such as may be used for curing non-pneumatic tires, can include a first mold section having a longitudinally-extending mold axis and a curing shoe assembly supported on the first mold section. The curing shoe assembly can include an actuation cup supported on the first mold section such that the actuation cup is disposed in radially-offset alignment with the mold axis. The actuation cup can include a cup wall that at least partially defines a cup chamber. A first actuation member can extend between a first member end and a second member end. The first actuation member can extend through and/or can be operatively supported on the cup wall such that the first member end thereof is disposed within the cup chamber. The first actuation member is translatable along a first member axis that is oriented transverse to the mold axis. A second actuation member can extend between a first member end and a second member end. The second actuation member can extend through and/or can be operatively supported on the cup wall such that the first member end thereof is disposed within the cup chamber. The second actuation member is translatable along a second member axis that is oriented transverse to the mold axis and disposed at an acute included angle relative to the first member axis. A first curing shoe can be supported on the second end of the first actuation member and a second curing shoe can be supported on the second end of the second actuation member in spaced relation to the first curing shoe. Upon application of fluid pressure to the first ends of the first and second actuation members, the first and second curing shoes can be displaced laterally away from the actuation cup and laterally away from one another into engagement with an associated non-pneumatic tire.

DETAILED DESCRIPTION

Turning now to the drawings, it is to be understood that the showings are for purposes of illustrating examples of the subject matter of the present disclosure and that the same are not intended to be limiting. Additionally, it will be appreciated that the drawings are not to scale and that portions of certain features and/or elements may be exaggerated for purpose of clarity and/or ease of understanding.

Figure 1:
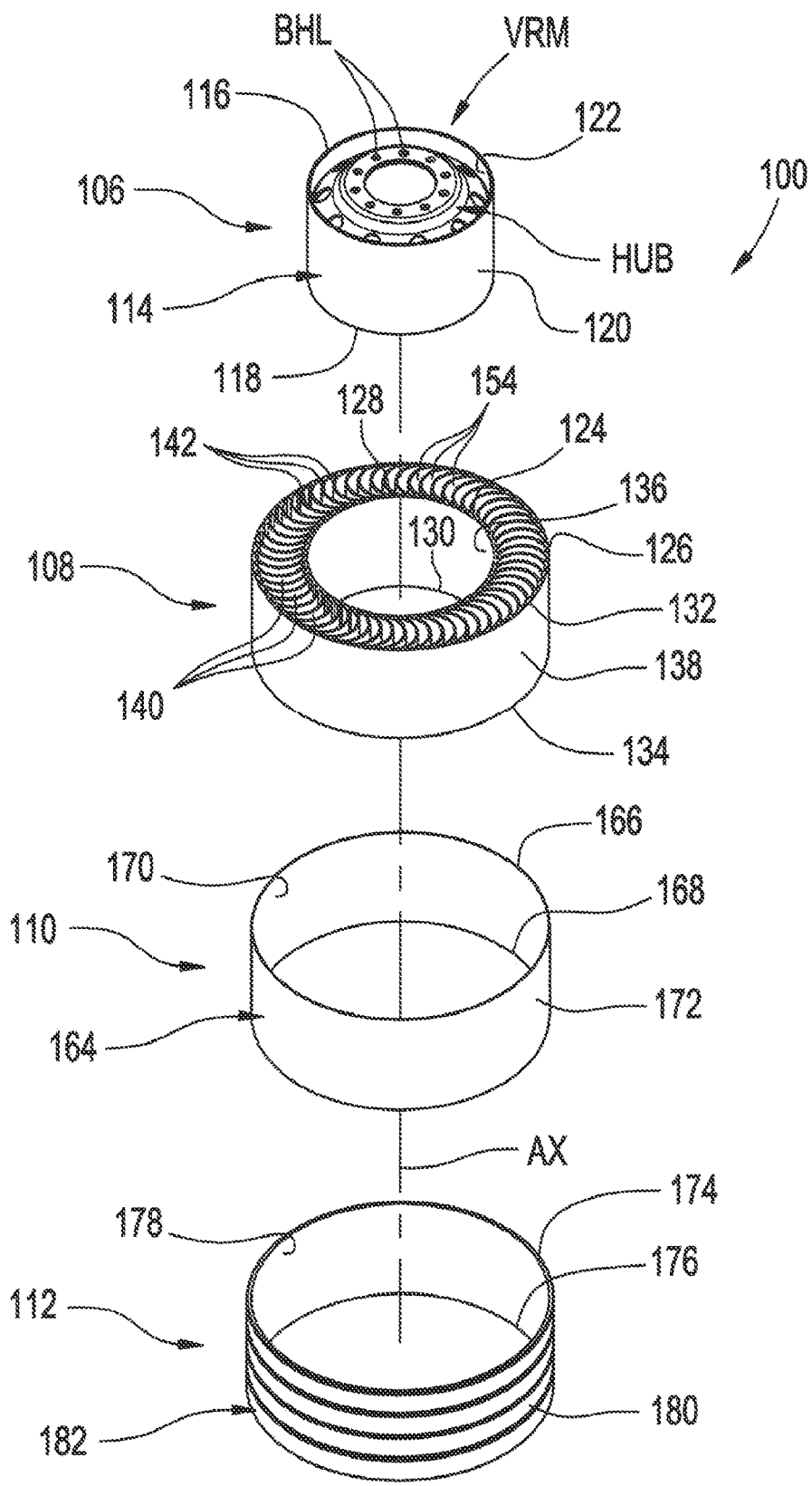
FIG. 1 is an exploded top perspective view of components of an exemplary less-than-fully-cured non-pneumatic tire shown prior to assembly.
Figure 2:
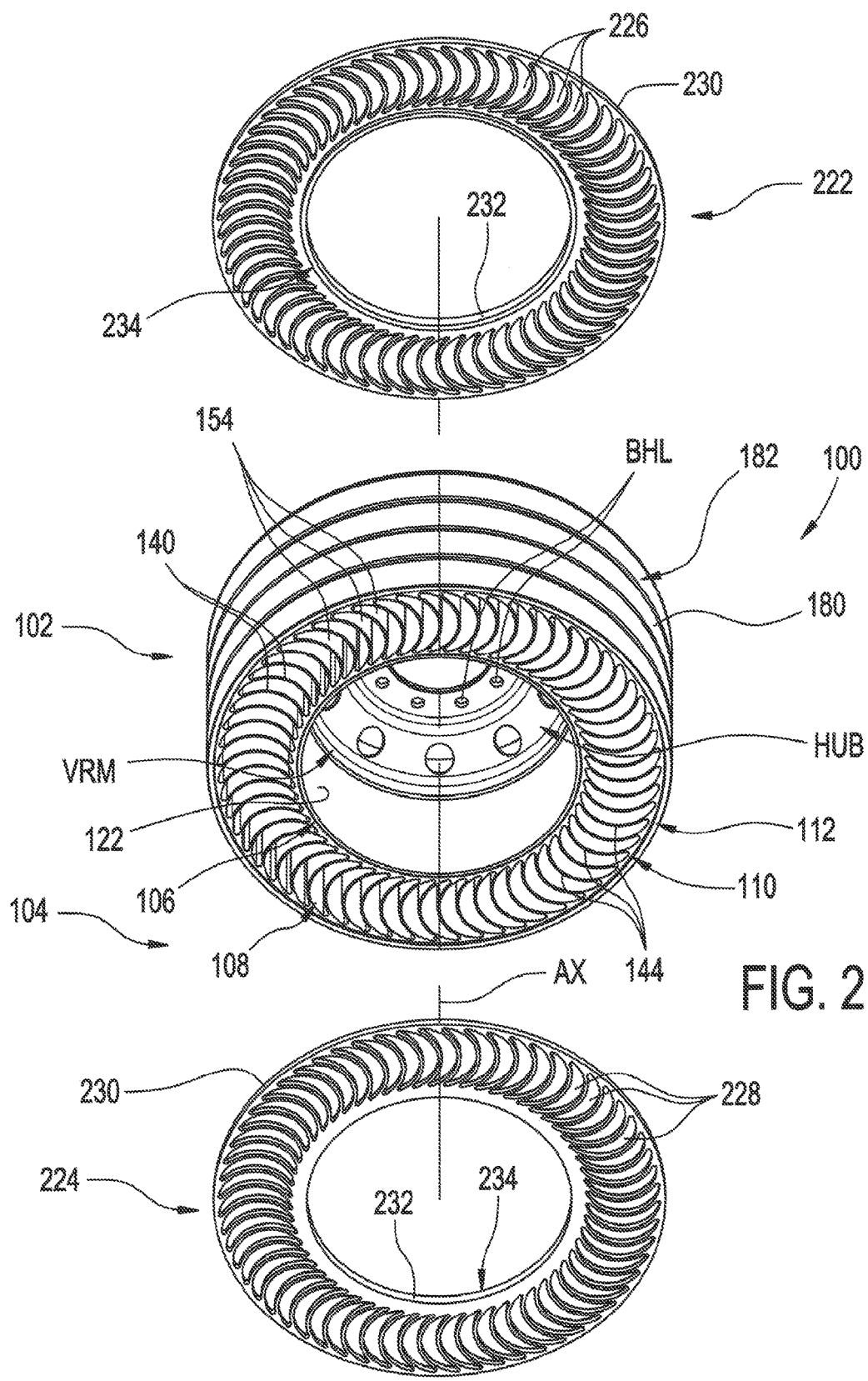
FIG. 2 is a bottom perspective view of the exemplary less-than-fully-cured non-pneumatic tire in an assembled condition and prepared for curing.

FIGS. 1 and 2 illustrate one example of a less-than-fully-cured non-pneumatic tire dimensioned and/or otherwise configured for curing in a mold assembly in accordance with the subject matter of the present disclosure and/or by way of a method of manufacture in accordance with the subject matter of the present disclosure. It will be appreciated that non-pneumatic tires of various of types, kinds and/or constructions have been developed and/or used in different applications and/or environments. As one non-limiting example, less-than-fully-cured non-pneumatic tire (or tire assembly) 100 is shown in FIGS. 1-7 as having a longitudinal axis AX and can extend axially from an end 102 to an end 104 that is opposite end 102. Less-than-fully-cured non-pneumatic tire 100 can include an annular ring 106 that extends peripherally about axis AX and a structure body 108 that is disposed outwardly of at least a portion of annular ring 106 and also extends peripherally about axis AX. Less-than-fully-cured non-pneumatic tire 100 can also include an annular ring 110 that extends peripherally around axis AX with at least a portion of annular ring 110 disposed outwardly of annular ring 106 and/or structure body 108. Less-than-fully-cured non-pneumatic tire 100 can further include a tread body 112 extending peripherally around axis AX with at least a portion of tread body 112 disposed outwardly of annular ring 110.

It will be appreciated that mold assemblies and methods of manufacture in accordance with the subject matter of the present disclosure are used to transition a non-pneumatic tire having one or more portions formed from a less-than-fully-cured elastomeric material into a non-pneumatic tire in which all or substantially all portions thereof are substantially-entirely cross-linked, vulcanized and/or otherwise cured. As such, it will be appreciated and understood that any one or more of the foregoing components of non-pneumatic tire 100 can include elastomeric material to be transitioned from a less-than-fully-cured condition to at least a substantially-entirely cured condition, and that arrangements of non-pneumatic tire 100 that are shown and described herein are merely exemplary and not intended to be limiting.

It will be appreciated that annular ring 106 can be of any suitable size, shape and/or configuration, and can include any suitable number of one or more walls and/or wall portions. As one non-limiting example, the annular ring could be a part of or otherwise at least partially form an outer wall or outer wall portion of a vehicle wheel or rim, such as is represented in FIGS. 1 and 2 by reference characters VRM. In such an exemplary arrangement, annular ring 106 can include a ring wall (or ring wall portion) 114 extending peripherally around longitudinal axis AX. Optionally, annular ring 106 can include a hub wall (or hub wall portion) HUB disposed inwardly of ring wall portion 114. If included, hub wall portion HUB can be operatively connected to ring wall portion 114. Additionally, if included, hub wall portion HUB can, optionally, be dimensioned and/or otherwise adapted for mounting in a conventional manner on or along an associated component or device, such as an axle of an associated vehicle by way of bolt holes BHL, for example.

Ring wall portion 114 of annular ring 106 can extend axially between a ring edge 116 disposed toward end 102 and a ring edge 118 that is disposed toward end 104 in axially-spaced relation to ring edge 116. Ring wall portion 114 can include an outer surface portion 120 that faces radially outward and extends peripherally about longitudinal axis AX and axially between ends 102 and 104. In some cases, ring wall portion 114 can, optionally, include an inner surface portion 122 that extends peripherally about longitudinal axis AX and faces radially inward axially along and/or between end 102 and/or end 104.

Structure body 108 can include an inner wrap or layer 124 and an outer wrap or layer 126 disposed radially outward of inner layer 124. Inner and outer layers 124 and 126 extend axially between ends 102 and 104 with inner layer 124 extending axially between edges 128 and 130 and outer layer 126 extending axially between edges 132 and 134. In some cases, inner and outer layers 124 and 126 can be substantially coextensive with one another such that edges 128 and 132 are at least approximately aligned with one another along end 102 and edges 130 and 134 are at least approximately aligned with one another along end 104. Inner layer 124 can at least partially define an inside surface portion 136 of structure body 108 that extends peripherally around longitudinal axis AX and axially between ends 102 and 104. Outer layer 126 can at least partially define an outer surface portion 138 of structure body 108 that extends peripherally around longitudinal axis AX and axially between ends 102 and 104.

Structure body 108 also includes a plurality of support structures 140 that extend between and operatively interconnect inner and outer layers 124 and 126. It will be appreciated that support structures 140 can be of any suitable shape, configuration and/or arrangement, and can be operatively connected to inner and outer layers 124 and 126 in any suitable manner. As one non-limiting example, support structures 140 can extend axially from an edge 142 disposed toward end 102 to an edge 144 disposed toward end 104. Support structures 140 can also include an end 146 disposed toward inner layer 124 and an end 148 disposed toward outer layer 126 in spaced relation to end 146. Support structures 140 are shown and described herein as having a curved or otherwise non-linear profile along a plane taken transverse to longitudinal axis AX. Support structures 140 are shown and described as having a concave surface portion 150 facing one circumferential direction about longitudinal axis AX and a convex surface portion 152 facing the opposite circumferential direction. It will be appreciated, however, that such configurations are merely exemplary and that support structures with other shapes and/or profiles could alternately be used without departing from the subject matter of the present disclosure.

Support structures 140 are disposed in peripherally-spaced relation to one another around longitudinal axis AX such that a plurality of spaces 154 are also disposed in peripherally-spaced relation to one another around the longitudinal axis with one of spaces 154 disposed between adjacent ones of support structures 140. In such an arrangement, spaces 154 can have an arcuate, curved or otherwise approximately crescent-shaped cross-sectional profile or configuration with concave surface portion 150 of one support structure 140 and convex surface portion 152 of an adjacent support structure 140 at least partially defining peripherally-spaced sides of spaces 154. In some cases, support structures 140 can extend into or otherwise be at least partially embedded within inner layer 124 and/or outer layer 126. In such cases, a portion 156 of inner layer 124 can at least partially define an end surface portion 158 of spaces 154, such as may have a curved or otherwise non-linear cross-sectional shape and/or configuration. Additionally, or in the alternative, a portion 160 of outer layer 126 can at least partially define an end surface portion 162 of spaces 154, such as may have a curved or otherwise nonlinear cross-sectional shape and/or configuration.

It will be appreciated that annular ring 110 can be of any suitable size, shape and/or configuration, and can include any suitable number of one or more walls and/or wall portions. As one non-limiting example, annular ring 110 can include a ring wall (or ring wall portion) 164 extending peripherally around longitudinal axis AX. Ring wall portion 164 can extend axially between a ring edge 166 disposed toward end 102 and a ring edge 168 that is disposed toward end 104 in axially-spaced relation to ring edge 166. Ring wall portion 164 can include an inner surface portion 170 that faces radially inward and extends peripherally about longitudinal axis AX and axially along and/or otherwise between ends 102 and 104. Ring wall portion 164 can also include an outer surface portion 172 that extends peripherally about longitudinal axis AX and faces radially outward axially along and/or between end 102 and/or end 104.

Tread body 112 can extend axially between ends 102 and 104 with a tread edge 174 disposed along end 102 and a tread edge 176 disposed along end 104. Tread body 112 can also include an inside surface portion 178 that faces radially inward and an outer surface portion 180 that faces radially outward. One or more tread structures 182 (e.g., grooves, ribs, lugs, sipes) can, optionally, be pre-formed on or otherwise extend into tread body 112 from along outer surface portion 180 of less-than-fully-cured non-pneumatic tire 100 with such tread structures adapted during the curing process to at least partially define a ground-engaging tread (or tread pattern) on the cured non-pneumatic tire.

As discussed above, one or more walls and/or wall portions of non-pneumatic tire 100 can be formed from an elastomeric material that is in a less-than-fully-cured condition such that at least these walls and/or wall portions are curable using a mold assembly and/or method of manufacture in accordance with the subject matter of the present disclosure. For example, tread body 112 can be at least partially formed from a less-than-fully-cured elastomeric material. Additionally, or in the alternative, one or more of inner layer 124 and/or outer layer 126 of structure body 108 can be at least partially formed from a less-than-fully-cured elastomeric material. As a further example, and/or as another alternative, support structures 140 can, optionally, include one or more layers of less-than-fully-cured elastomeric material. As non-limiting examples of such constructions, support structures 140 can, in some cases, be at least partially formed from sheets of comparatively-rigid material (e.g., metal, fiber-reinforced composite) of which ends 146 and 148 can, respectively, be at least partially embedded or otherwise disposed within inner and outer layers 124 and 126 of structure body 108. Additionally, or in the alternative, a layer of less-than-fully-cured elastomeric material can extend along and/or at least partially define concave surface portion 150 and/or convex surface portion 152. As another non-limiting example, support structures 140 can be at least partially formed from a plurality of comparatively-rigid wires and/or filaments arranged adjacent one another and at least partially embedded in a quantity of less-than-fully-cured elastomeric material to at least partially form a sheet-like structure.

It will be appreciated that less-than-fully-cured non-pneumatic tire 100 can include any suitable elastomeric material or combination of elastomeric materials, such as natural rubbers, synthetic rubbers and/or thermoplastic elastomers, for example. Additionally, it will be recognized and appreciated, in some cases, a variety of components can be formed from a common less-than-fully-cured elastomeric material. In other cases, however, less-than-fully-cured elastomeric materials of two or more compositions, compounds and/or grades can be used. Terms such as "less-than-fully-cured," and the like, as used herein refer to elastomeric materials having polymer chains that become cross-linked or otherwise bonded when subjected to heat, pressure and/or chemical compounds with "fully cured" or "substantially fully cured" elastomeric materials exhibiting substantially different material and/or mechanical properties than "less-than-fully-cured" elastomeric materials. One non-limiting example of a suitable curing process includes vulcanization of natural and synthetic rubber elastomers.

It will be appreciated that any combination of one or more less-than-fully-cured elastomeric materials can be used or otherwise included in a less-than-fully-cured non-pneumatic tire (e.g., non-pneumatic tire 100). As one non-limiting example, less-than-fully-cured non-pneumatic tire 100 can include one or more quantities of elastomeric material substantially all of each of which is in a "green" or substantially-entirely uncured condition. As another non-limiting example, less-than-fully-cured non-pneumatic tire 100 can include one or more quantities of elastomeric material that is/are in a "green" or substantially-entirely uncured condition and one or more quantities of elastomeric material that is/are in an at least partially cured condition. As a further non-limiting example, less-than-fully-cured non-pneumatic tire 100 can include one or more quantities of elastomeric material that is/are in a partially but not entirely cured condition. As such, it is to be recognized and appreciated that less-than-fully-cured non-pneumatic tire 100 can include, without limitation: one or more quantities of "green" or substantially-entirely uncured elastomeric material; or, one or more quantities of partially but not fully cured elastomeric material; or, both one or more quantities of "green" or substantially-entirely uncured elastomeric material and one or more quantities of partially but not fully cured elastomeric material.

Figure 3:
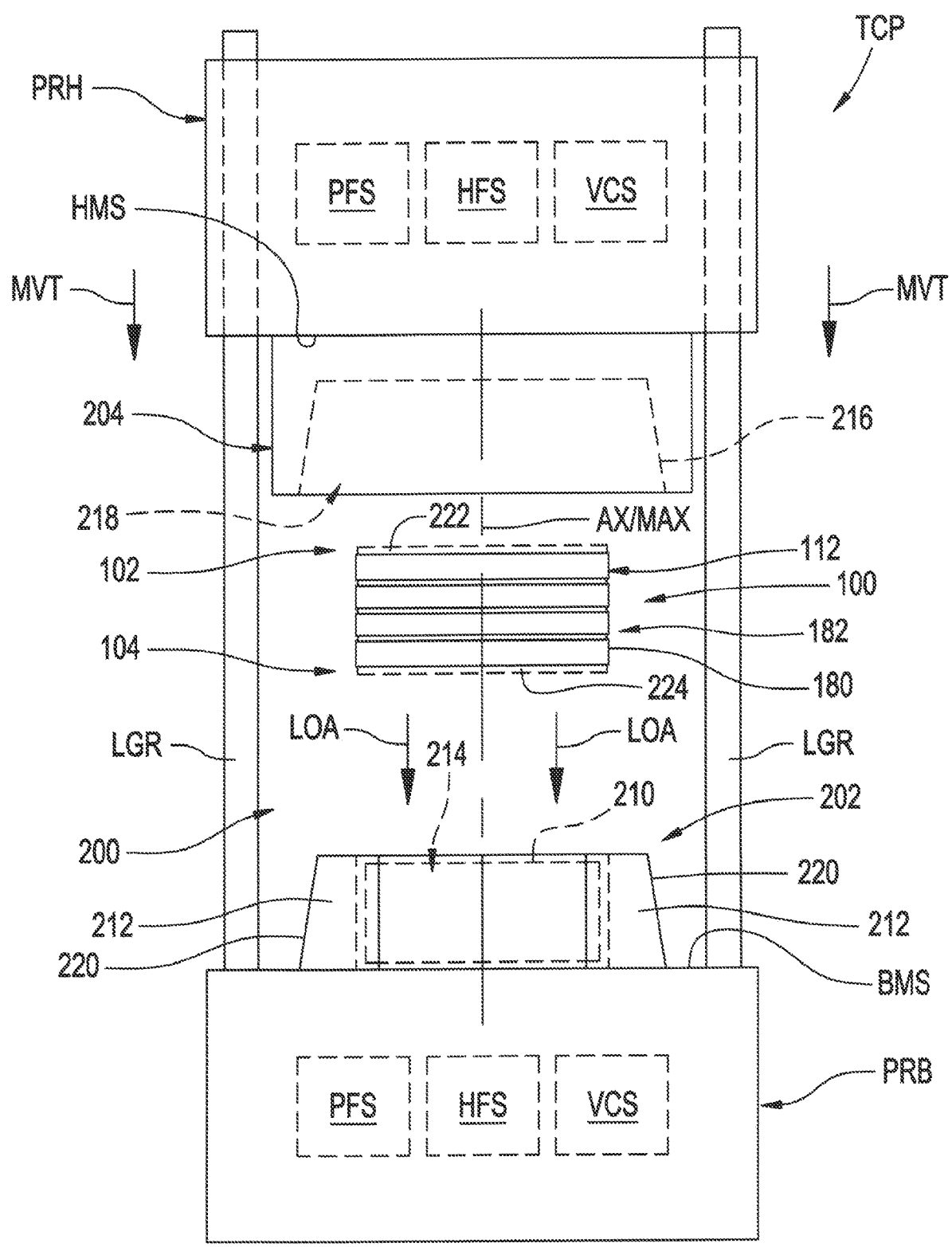
FIG. 3 is a front elevation view of a tire curing press shown with a mold assembly in an open condition and the exemplary less-than-fully-cured non-pneumatic tire being loaded.
Figure 4:
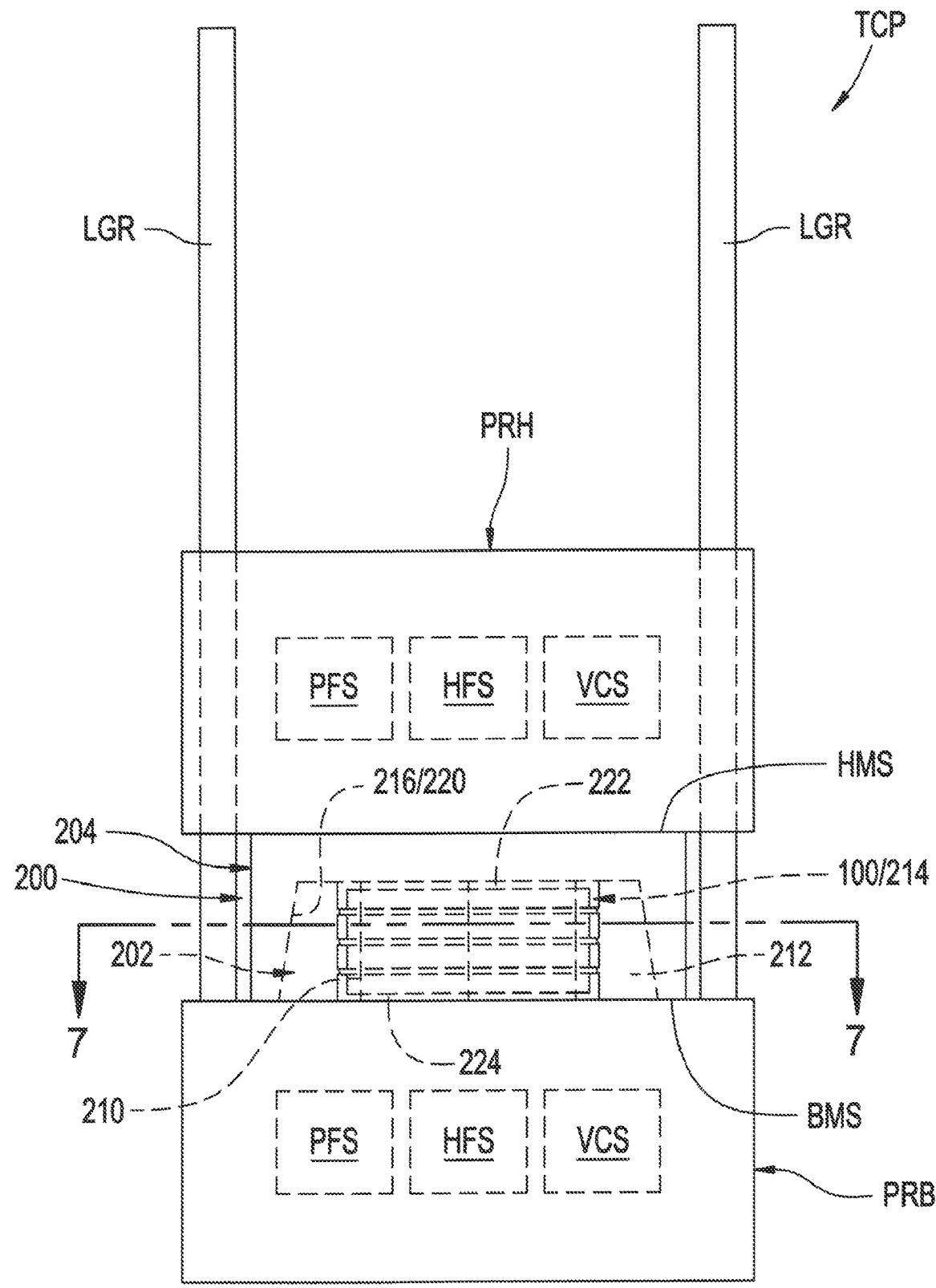
FIG. 4 is a front elevation view of the tire curing press of FIG. 3 shown with the mold assembly in a closed condition and the exemplary less-than-fully-cured non-pneumatic tire loaded for curing.
Figure 5:
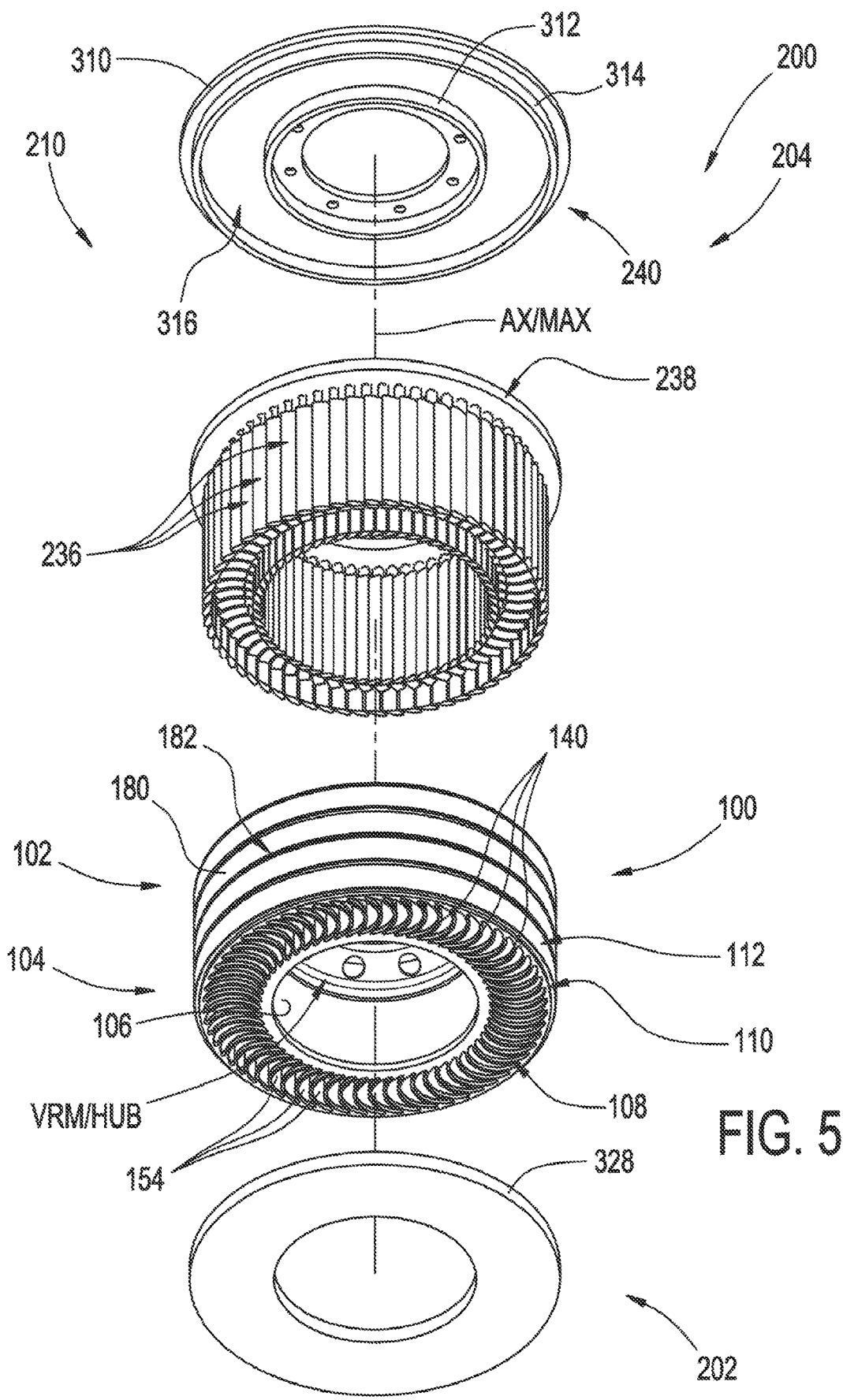
FIG. 5 is an exploded bottom perspective view of the mold assembly showing an exemplary interstitial curing system prior to loading of the exemplary less-than-fully-cured non-pneumatic tire.
Figure 6:
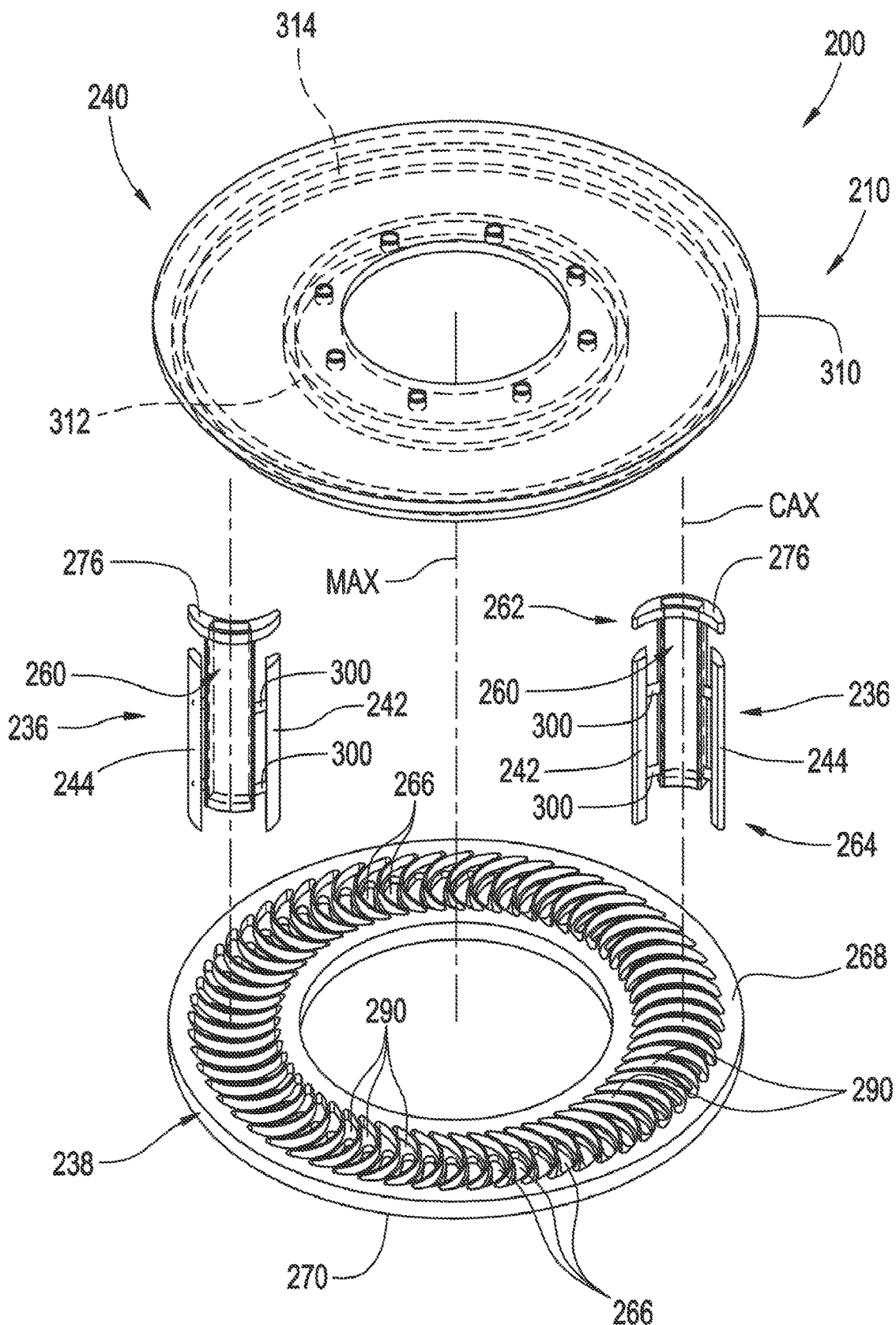
FIG. 6 is an exploded top perspective view of the exemplary interstitial curing system in FIG. 5.

FIGS. 3 and 4 schematically illustrate an otherwise conventional tire curing press TCP that includes a press base PRB with a base mounting surface BMS. Tire curing press TCP also includes a press head PRH with a head mounting surface HMS. Press head PRH is moveable relative to press base PRB, such as along linear guide rods LGR, for example, in a conventional manner. Press head PRH is shown in FIG. 3 as being disposed in a first or raised position that is moveable to a second or lowered position shown in FIG. 4, which movement is represented in FIG. 3 by arrows MVT. Tire curing press TCP can include one or more pressurized fluid sources, one or more heated fluid sources and/or one or more vacuum sources, such as are schematically represented in FIGS. 3 and 4 by dashed boxes PFS, HFS and VCS, respectively, and can be included on, along or be otherwise operatively associated with press base PRB and/or press head PRH, as is well known in the art.

A mold assembly 200 in accordance with the subject matter of the present disclosure is shown in FIGS. 3-9 as being operatively supported within or otherwise on or along tire curing press TCP. Mold assembly 200 includes a mold section 202 that is supported on or along base mounting surface BSM of press base PRB and a mold section 204 that is supported on or along head mounting surface HMS of press head PRH. Mold sections 202 and/or 204 can be operatively connected in fluid communication with pressurized fluid source PFS and/or vacuum source VCS in any manner suitable for transferring pressurized fluid to and/or from the mold sections, such as by way of one or more conduits or passages 206, for example. Additionally, or in the alternative, mold sections 202 and 204 can be operatively connected in fluid communication with heated fluid source HFS and/or vacuum source VCS in any manner suitable for transferring fluid (heated or otherwise) to and/or from the mold sections, such as by way of one or more of conduits or passages 208, for example.

Mold assembly 200 includes a mold axis MAX extending in or otherwise along the direction of movement MVT of tire curing press TCP. As such, mold sections 202 and 204 are axially displaceable relative to one another during operation of the tire curing press with mold sections 202 and 204 shown spaced apart in FIG. 3 representing an open condition of the mold assembly and with mold sections 202 and 204 shown coextensively engaged with one another in FIG. 4 representing a closed condition of the mold assembly. Mold section 202 includes an interstitial curing system 210 and a plurality of tread die segments 212 that are disposed peripherally about interstitial curing system 210 to at least partially define a mold cavity 214 within mold section 202. Mold section 204 includes a surface portion 216 that at least partially defines a mold cavity 218 within the mold section. Mold cavity 218 is dimensioned to receive at least a portion of mold section 202 in a closed condition of the mold assembly. In some cases, an outer surface portion 220 of tread die segments 212 can abuttingly engage surface portion 216 of mold section 204 as the mold sections move toward the closed condition.

For example, with a less-than-fully-cured non-pneumatic tire 100 loaded into or otherwise positioned at least partially within mold cavity 214, as is represented in FIG. 3 by arrows LOA and shown in FIG. 4, tread die segments 212 are displaced radially inward into engagement with tread body 112 of less-than-fully-cured non-pneumatic tire 100. Such radial compression urges inside surface portion 178 of tread body 112 into engagement with outer surface portion 172 of annular ring 110. Additionally, such radial compression urges inner surface portion 170 of annular ring 110 into engagement with outer surface portion 138 of structure body 108. In some cases, such radial compression can also urge inside surface portion 136 of structure body 108 into engagement with outer surface portion 120 of annular ring 106. Furthermore, tread die segments 212 include features formed therealong generally opposite surface portion 220 that extend into engagement with tread body 112 from along outer surface portion 180 thereof under such radial compression to at least partially define ground-engaging tread pattern (e.g., grooves, ribs, lugs, sipes) on or along non-pneumatic tire 100.

As shown in FIGS. 2-4, in some cases, a support plate 222 can be disposed along end 102 of less-than-fully-cured non-pneumatic tire 100. Additionally, or in the alternative, a support plate 224 can be disposed along end 104 of less-than-fully-cured non-pneumatic tire 100. If included, support plate 222 and/or 224 can aid in maintaining annular ring 106, structure body 108, annular ring 110 and/or tread body 112 in a desired axial position relative to one another (e.g., approximate axial alignment), such as during transport to tire curing press TCP, loading/unloading of non-pneumatic tire 100 into and/or out of mold assembly 200 (or a mold section thereof), and/or to rotationally index or otherwise position support structures 140 and/or spaces 154 around longitudinal axis AX relative to interstitial curing system 210 and/or other features of mold assembly 200. If included, support plates 222 and/or 224 can include a plurality of openings 226 and 228, respectively, that have a shape, configuration and/or arrangement complementary to support structures 140 and/or spaces 154 of less-than-fully-cured non-pneumatic tire 100 (e.g., radially offset from axis AX and disposed at a common peripheral spacing). As such, support plates 222 and/or 224, if included, together with non-pneumatic tire 100 can be positioned within mold cavity 214 and/or can be operatively engaged co-extensively with interstitial curing system 210. Support plates 222 and 224 also include an outer peripheral edge 230 that has, in a preferred arrangement, an outer cross-sectional dimension that is approximately equal to or less the outermost cross-sectional dimension of non-pneumatic tire 100 (e.g., diametrically across tread body 112). Additionally, in some cases, support plates 222 and 224 can, optionally, include an inner peripheral edge 232. Furthermore, in some cases, support plates 222 and 224 can, optionally, include an alignment ridge 234 dimensioned to operatively engage a portion of less-than-fully-cured non-pneumatic tire 100 (e.g., inner surface portion 122 of annular ring 106) such that alignment ridge 234 is axially coextensive with a portion of the non-pneumatic tire.

Figure 7:
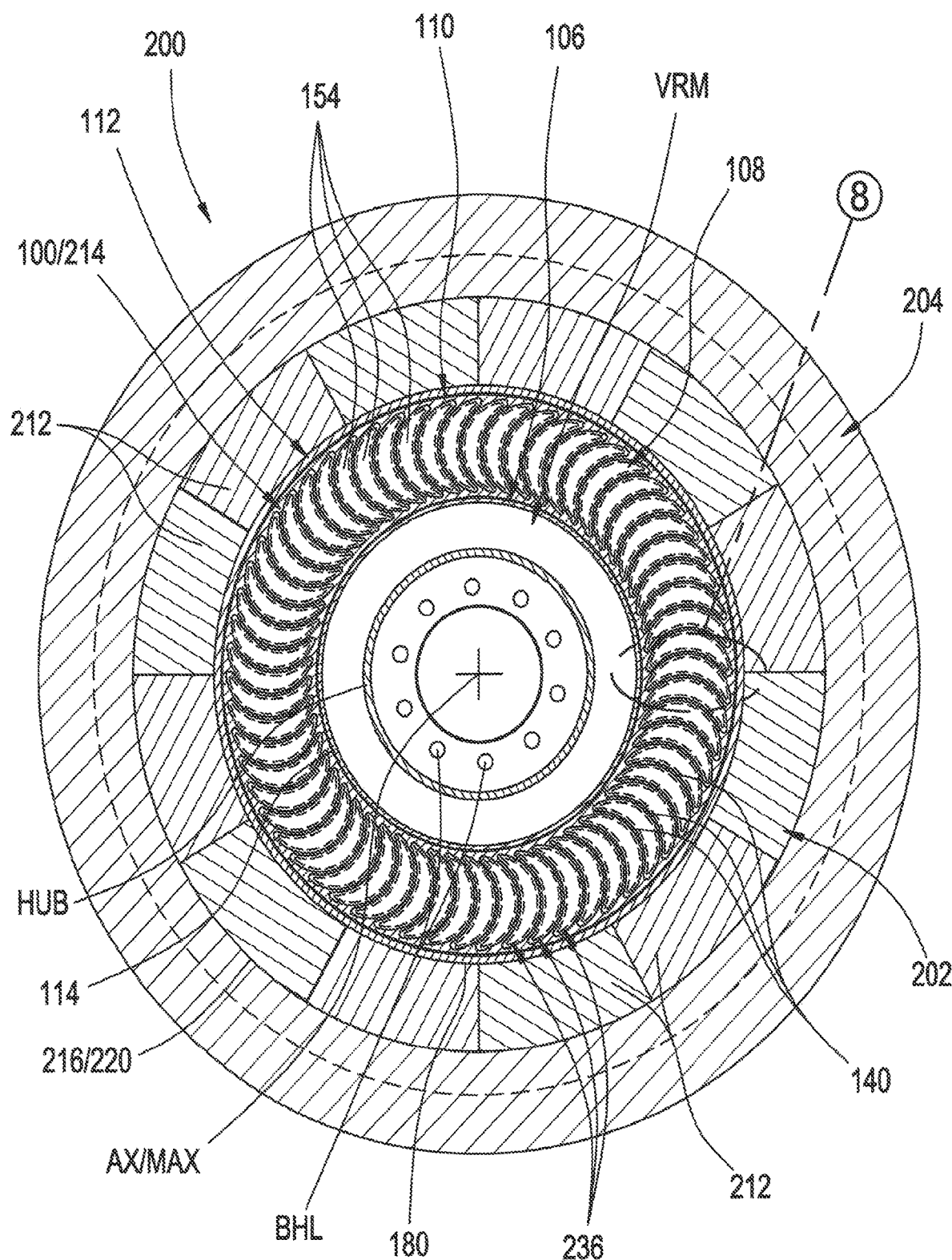
FIG. 7 is a cross-sectional top plan view of the mold assembly and exemplary less-than-fully-cured non-pneumatic tire in FIGS. 3-6 taken from along line 7-7 in FIG. 4.

As shown in FIGS. 5-11, interstitial curing system 210 includes a plurality of curing shoe assemblies 236, represented by dashed lines in FIG. 7, that are radially offset from mold axis MAX and arranged in peripherally-spaced relation to one another around the mold axis. In a preferred arrangement, curing shoe assemblies 236 are arranged such that one or more of the curing shoe assemblies is disposed within one of spaces 154 when less-than-fully-cured non-pneumatic tire 100 is positioned within mold cavity 214. In such an arrangement, curing shoe assemblies 236 can be selectively actuated and de-actuated (or otherwise released) such that the curing shoe assemblies correspondingly engage and disengage one or more walls and/or wall portions of structure body 108. In an engaged condition, the curing shoe assemblies can apply surface pressure and/or transfer heat into structure body 108, such as may operate to transition one or more walls and/or wall portions of the structure body that are formed from a less-than-fully-cured elastomeric material into a substantially-cured elastomeric material.

That is, in an actuated condition, curing shoe assemblies 236 can abuttingly engage and thereby apply pressure and/or transfer heat to inner layer 124 of structure body 108. In such an arrangement, the application of pressure by the curing shoe assemblies urges the inner layer toward annular ring 106. Additionally, or in the alternative, curing shoe assemblies 236 can, in an actuated condition, abuttingly engage and thereby apply pressure and/or transfer heat to outer layer 126 of structure body 108. In such an arrangement, the application of pressure by the curing shoe assemblies urges the outer layer toward annular ring 110. Furthermore, and/or as another alternative, curing shoe assemblies 236 can, in an actuated condition, abuttingly engage and thereby apply pressure and/or transfer heat to support structures 140 with adjacent curing shoe assemblies 236 applying pressure and/or transferring heat to the support structure disposed therebetween. In some cases, curing shoe assemblies 236 can apply pressure and/or heat on or along ends 146 and/or 148 of the support structure thereby ensuring ends 146 and/or 148 are in embedded engagement with inner and outer layers 124 and 126, respectively.

It will be appreciated that curing shoe assemblies in accordance with the subject matter of the present disclosure can be of any suitable type, kind and/or configuration, and can be operatively connected on and/or along mold section 202 and/or 204 in any suitable manner. In some cases, each of curing shoe assemblies 236 can be supported on or along mold section 202. In other cases, each of curing shoe assemblies 236 can be supported on or along mold section 204. In still other cases, one or more curing shoe assemblies 236 can be supported on or along mold section 202 with the remainder of curing shoe assemblies 236 supported on or along mold section 204, such as in an alternating or interleaved arrangement, for example.

As one non-limiting example, interstitial curing system 210 can include a support plate 238 on or along which one or more of curing shoe assemblies 236 can be secured or otherwise supported. Additionally, or in the alternative, interstitial curing system 210 can include a fluid-pressure transfer (or distribution) system 240 operatively associated with one or more of curing shoe assemblies 236. In the exemplary arrangement shown in FIGS. 5-11, support plate 238 is supported on or along mold section 204 and fluid-pressure transfer system 240 is operatively disposed between support plate 238 and mold section 204. In this manner, support plate 238 together with any one or more curing shoe assemblies 236 supported thereon and transfer system 240 can be separated from mold section 202 in an open condition of mold assembly 200 to permit non-pneumatic tire 100 to be loaded and unloaded. Support plate 238 together with any one or more curing shoe assemblies 236 supported thereon and fluid-pressure transfer system 240 can then be moved into engagement with mold section 202 in a closed condition of mold assembly 200.

Figure 8:
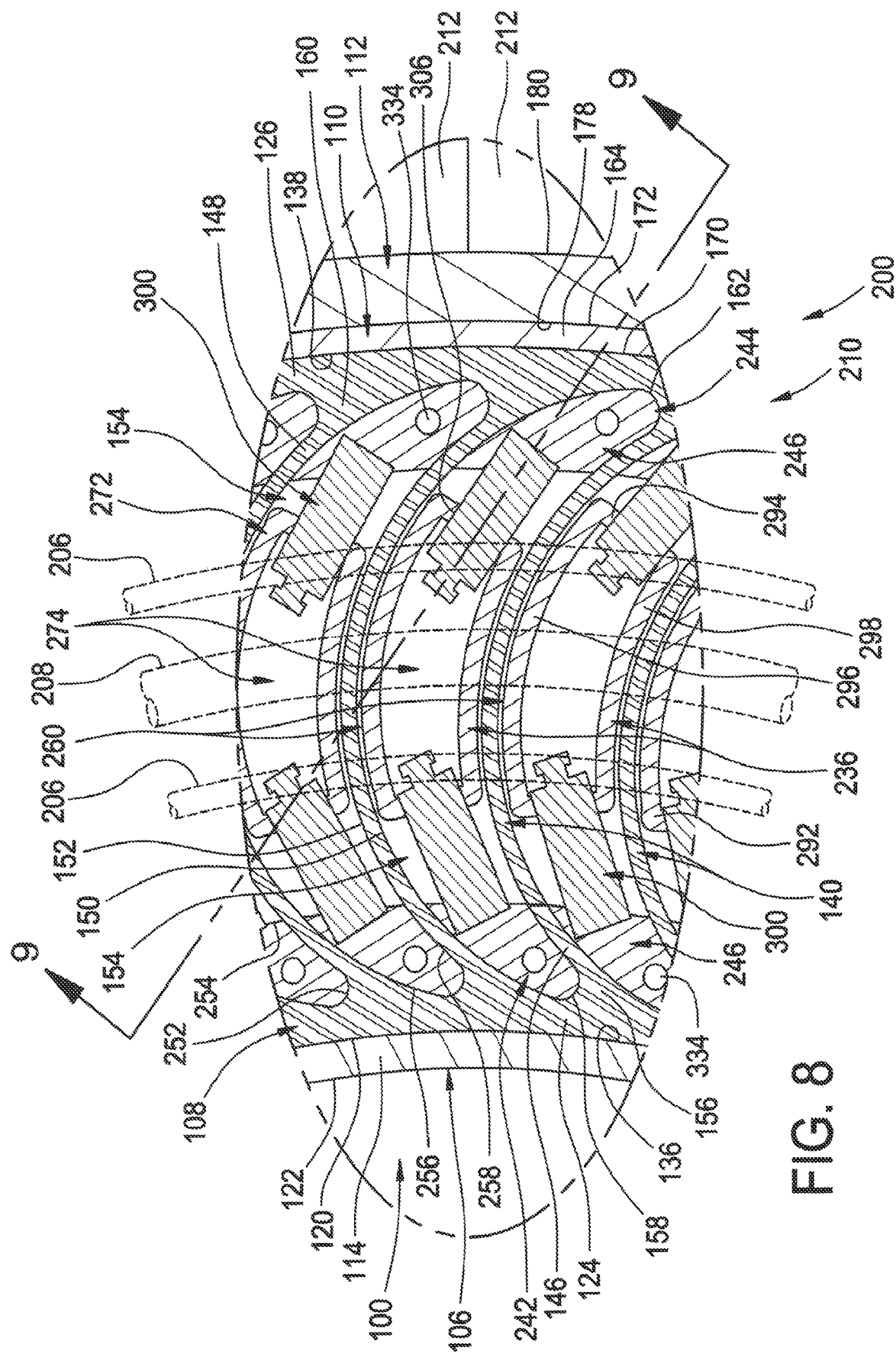
FIG. 8 is an enlarged view of the portion of the mold assembly and exemplary less-than-fully-cured non-pneumatic tire identified as Detail 8 in FIG. 7.
Figure 11:
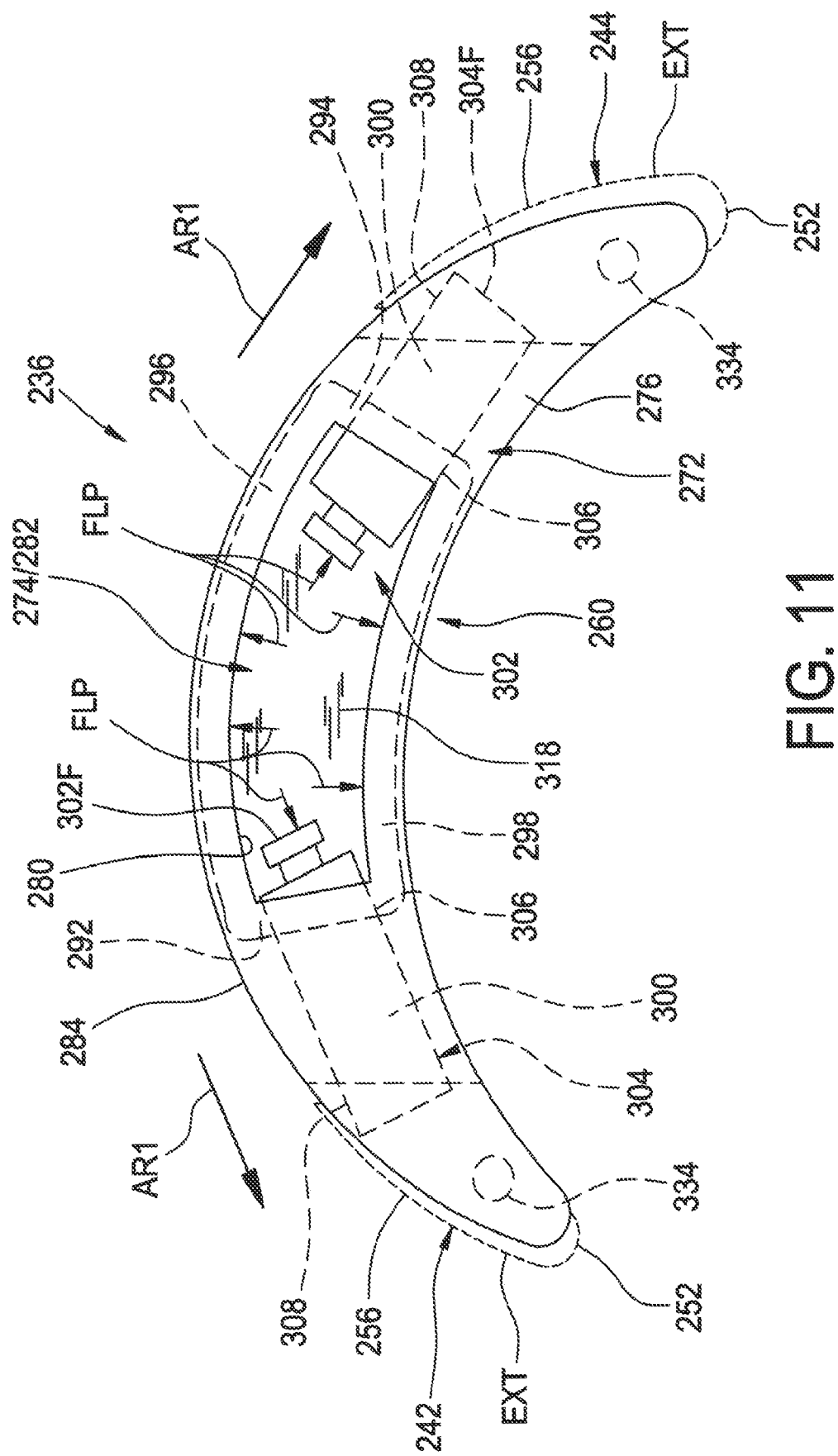
FIG. 11 is a top plan view of the exemplary curing shoe assembly shown in FIGS. 5-10.

Curing shoe assemblies 236 can include any suitable combination of components operable to actuate and de-actuate (or otherwise release or retract) the curing shoe assemblies during a manufacturing process in accordance with the subject matter of the present disclosure. For example, curing shoe assemblies 236 can include curing shoes 242 and 244 that are supported on or along support plate 238 for lateral displacement between a retracted position (i.e., a de-actuated condition), which is shown in FIG. 11, and an extended position (i.e., an actuated condition), which is shown in FIG. 8 and represented by dashed lines EXT in FIG. 11. It will be recognized and appreciated that the retracted position (i.e., de-actuated condition) is suitable for loading and unloading of non-pneumatic tire 100 into and out of mold assembly 200, and that the extended position (i.e., actuated condition) is suitable for performing the subject manufacturing process of curing non-pneumatic tires. As such, it will be appreciated that curing shoes 242 and 244 can be supported on or along the support plate in any suitable orientation relative to one another, such as may corresponds to curable features of less-than-fully-cured non-pneumatic tire 100. In a preferred arrangement, curing shoes 242 and 244 are displaced in opposing directions such that the curing shoes generate fully or partially (e.g., acting at an obtuse included angle) counteracting forces (e.g., radially-inward pressure on layer 124 from curing shoe 242 and radially-outward pressure on layer 126 from curing shoe 244).

Curing shoes 242 and/or 244 can include any suitable number of walls, wall portions, surfaces and/or surface portions. In some cases, curing shoes 242 and 244 can be of different sizes, shapes and/or profiles such as may be complementary or otherwise at least partially correspond to features and/or characteristics of support structures 140 and/or other walls and/or wall portions of non-pneumatic tire 100, for example. As a non-limiting example, curing shoes 242 and 244 can include a shoe body wall 246 that extends axially between an end surface portion 248 and an end surface portion 250. Shoe body wall 246 includes an outer edge surface portion 252 extending axially between end surface portions 248 and 250 that faces outward generally away from the opposing curing shoe. Outer edge surface portion 252 has a curved cross-sectional profile. In a preferred arrangement, outer edge surface portion 252 can have a profile or shape complementary or otherwise corresponding to end surface portion 158 of inner layer 124 and/or end surface portion 162 of outer layer 126 of structure body 108. An inner edge surface portion 254 extends axially between end surface portions 248 and 250 and faces inward toward the opposing curing shoe. Shoe body wall 246 also includes side surface portions 256 and 258 that extend axially between end surface portions 248 and 250 and extend laterally between outer edge surface portion 252 and inner edge surface portion 254. Side surface portions 256 and 258 have curved cross-sectional profiles with side surface portion 256 having a convex shape that can be complementary or otherwise correspond to concave surface portions 150 of support structures 140 and side surface portion 258 having a concave shape that can be complementary or otherwise correspond to convex surface portions 152 of support structures 140.

It will be appreciated that curing shoes 242 and 244 can be operatively supported on, along or otherwise between support plate 238 and transfer system 240 in any suitable manner. As one non-limiting example, curing shoe assemblies 236 can include an actuation cup 260 that extends longitudinally along a cup axis CAX (FIG. 10) that is disposed in offset alignment with mold axis MAX. Actuation cup 260 extends axially from an end 262 disposed along support plate 238 toward an end 264 disposed in spaced relation to end 262 axially away from support plate 238. It will be appreciated that actuation cups 260 can be secured on or along support plate 238 in any suitable manner. As one non-limiting example, support plate 238 can include a plurality of openings or passages 266 through which actuation cups 260 extend such that end 262 of the actuation cups is positioned on or along a side or surface portion 268 of support plate 238 and end 264 is positioned on or along a side or surface portion 270 of the support plate. Openings 266 are disposed in peripherally-spaced relation to one another about mold axis MAX. In a preferred arrangement, openings 266 can have a shape, configuration and/or arrangement complementary to support structures 140 and/or spaces 154 of less-than-fully-cured non-pneumatic tire 100 (e.g., radially offset from axis AX and disposed at a common peripheral spacing), such as has been described above in connection with support plates 222 and 224, for example.

Actuation cups 260 include a cup body 272 that can include any suitable number of one or more walls and/or wall portions. Actuation cups 260 include a cup chamber 274 that is at least partially defined by one or more walls and/or wall portions of cup body 272. As a non-limiting example, cup body 272 can include an end wall portion 276 that is disposed on or along end 262 of the actuation cup and an end wall portion 278 that is disposed on or along end 264 of the actuation cup. End wall portions 276 and 278 are shown as being oriented generally transverse to cup axis CAX. End wall portion 276 includes an inner peripheral edge portion 280 that at least partially defines an opening 282 in fluid communication with cup chamber 274. End wall portion 276 extends outwardly to an outer peripheral edge portion 284 with a surface portion 286 facing away from end 264 and a surface portion 288 facing toward end 264.

It will be appreciated that end wall portion 276 can be disposed on or along support plate 238 in any suitable manner. For example, in some cases, end wall portion 276 can be disposed on or along support plate 238 such that surface portion 288 is disposed in abutting engagement with surface portion 268 of the support plate. Additionally, or in the alternative, support plate 238 can include a plurality of recesses 290 extending into the support plate from along surface portion 268. In some cases, recesses 290 can have a cross-sectional profile or shape as well as a configuration and/or arrangement that is complementary to openings 266 in the support plate and/or to support structures 140 and/or spaces 154 of less-than-fully-cured non-pneumatic tire 100 (e.g., radially offset from axis AX and disposed at a common peripheral spacing). In some cases, outer peripheral edge 284 of end wall portions 276 can have a cross-sectional profile and/or shape that is complementary to recesses 290 and/or openings 266 of the support plate. In such cases, end wall portion 276 can be positioned at least partially within recesses 290 such that surface portion 286 of the end wall portion is disposed in approximate alignment with surface portion 268 of the support plate. It will be appreciated, however, that other configurations and/or arrangements could alternately be used without departing from the subject matter of the present disclosure.

Cup body 272 can also include an edge wall portion 292 and an edge wall portion 294 that is spaced apart from edge wall portion 292 such that at least a portion of cup chamber 274 is disposed therebetween. Additionally, or in the alternative, cup body 272 can include a side wall portion 296 and a side wall portion 298 that is spaced apart from side wall portion 296 such that at least a portion of cup chamber 274 is disposed therebetween. Edge wall portions 292 and 294 extend axially from along end 262 toward end 264 of the actuation cup. Side wall portions 296 and 298 extend axially from along end 262 toward end 264 and laterally from along edge wall portion 292 toward edge wall portion 294. In such an arrangement, end wall portion 276 extends outwardly beyond the edge and side wall portions, such as may form a mounting flange along the cup body with end 262 being open. Additionally, in such an arrangement, end wall portion 278 can extend between and operatively connect the edge and side wall portions such that end 264 of the cup body and the cup chamber is closed. It will be appreciated, however, that other configurations and/or arrangements could alternately be used without departing from the subject matter of the present disclosure.

Curing shoe assemblies 236 are supported on or along support plate 238 for lateral displacement of curing shoes 242 and 244 relative to mold axis MAX. In accordance with the subject matter of the present disclosure, curing shoes 242 and 244 are supported on or along actuation cups 260, and are displaced between extended and retracted positions through the application and/or change of fluid pressure within cup chambers 274. It will be appreciated that fluid pressure from cup chambers 274 can be converted into lateral displacement forces in any suitable manner and/or through any combination of components operatively connected between actuation cups 260 and curing shoes 242 and/or 244. In one exemplary arrangement, curing shoe assemblies 236 can include one or more piston or actuation members 300 that extend between and operatively connect actuation cups 260 and curing shoes 242 and/or 244. Actuation members 300 can include an actuation member axis AMX and extend axially between an end 302 and an end 304. In some cases, actuation members 300 can include an end surface portion 302F on or along end 302, such as may be oriented transverse to actuation member axis AMX, for example. Additionally, or in the alternative, actuation members 300 can include an end surface portion 304F on or along end 304, such as may be oriented transverse to actuation member axis AMX, for example. It will be appreciated that actuation members 300 can be of any suitable size, shape and/or configuration, such as having a polygonal (e.g., rectangular) or round (e.g., circular) cross-sectional shape, for example. As a non-limiting example, two or more actuation members having an approximately circular cross-sectional shape can be used. Cup body 272 can include one or more holes or passages 306 extending therethrough, such as on or along edge wall portions 292 and/or 294, for example. Actuation members 300 can extend through cup body 272 such that ends 302 of the actuation members are disposed in fluid communication with cup chamber 274. Ends 304 of the actuation members are operatively connected with shoe body walls 246 of curing shoes 242 and/or 244, such as by way of one or more threaded connections and/or flowed-material joints, for example, which are collectively represented in FIGS. 9 and 10 by dashed lines 308.

As discussed above, curing shoe assemblies 236 can be actuated and/or de-actuated by way of any suitable combination of one or more force applicators. For example, mold assembly 200 and/or interstitial curing system 210 thereof can be communicatively coupled with pressurized fluid source PFS, for example. In such case, pressurized fluid (e.g., air, steam, water, oil) from pressurized fluid source PFS can apply, balance and/or otherwise control the application of forces to curing shoe assemblies as the same are selectively displaced between extended and retracted positions, such as may respectively correspond to actuated and de-actuated conditions of the curing shoe assemblies.

It will be appreciated that forces generated and/or otherwise controlled by pressurized fluid source PFS can be selectively applied, balanced and/or otherwise transferred to and/or from curing shoe assemblies 236 in any suitable manner. In one exemplary arrangement, mold assembly 200 and/or interstitial curing system 210 can include fluid-pressure transfer system 240 that is in fluid communication with pressurized fluid source PFS through conduits 206 and operatively associated with cup chambers 274 and actuator members 300 of curing shoe assemblies 236. Fluid-pressure distribution system 240 can include a base plate 310 that can be supported on or along mold section 204. Fluid-pressure distribution system 240 can also include an inner side wall 312 and an outer side wall 314 that are supported on base plate 310 with the outer side wall spaced radially outward of the inner side wall. Support plate 238 is secured on or along inner and outer side walls 312 and 314 such that a fluid chamber 316 is at least partially defined therebetween. Fluid chamber 316 can be disposed in fluid communication with pressurized fluid source PFS in any suitable manner, such as by way of conduits 206, for example. In such an arrangement, an approximately uniform and/or otherwise balanced fluid pressure is applied to actuator members 300 (e.g., applied along end surface portion 302F), which transfers an approximately common and uniform actuation force to actuator members 300 and curing shoes 242 and/or 244. Additionally, or in the alternative, such conditions can also induce actuator members 300 to move approximately simultaneously. Thus, applying an approximately common actuation force to curing shoes 242 and/or 244 over an approximately uniform duration or application period.

Figure 9:
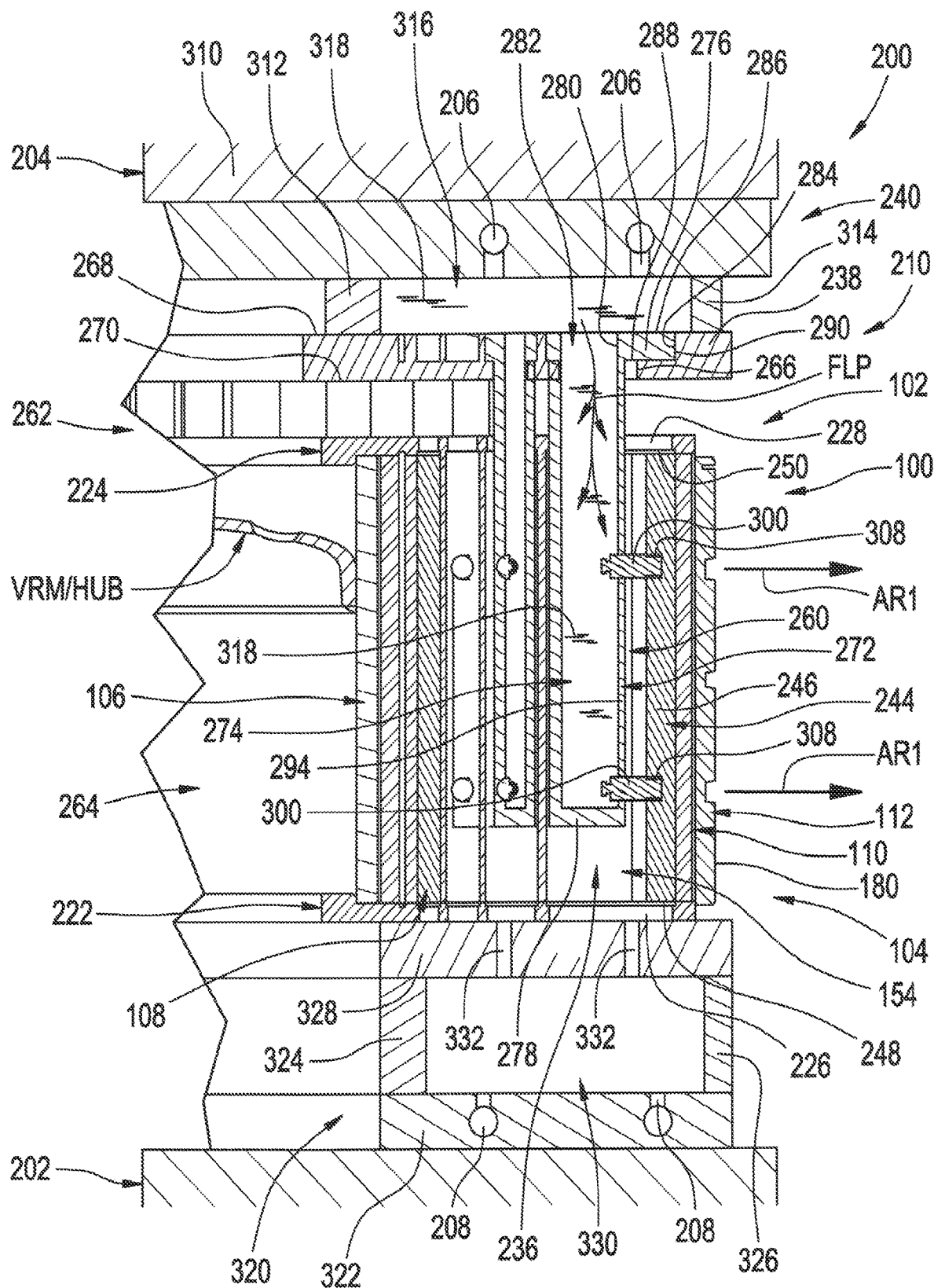
FIG. 9 is a cross-sectional side view of the mold assembly and exemplary less-than-fully-cured non-pneumatic tire in FIGS. 1-8 taken from along line 9-9 in FIG. 8.
Figure 10:
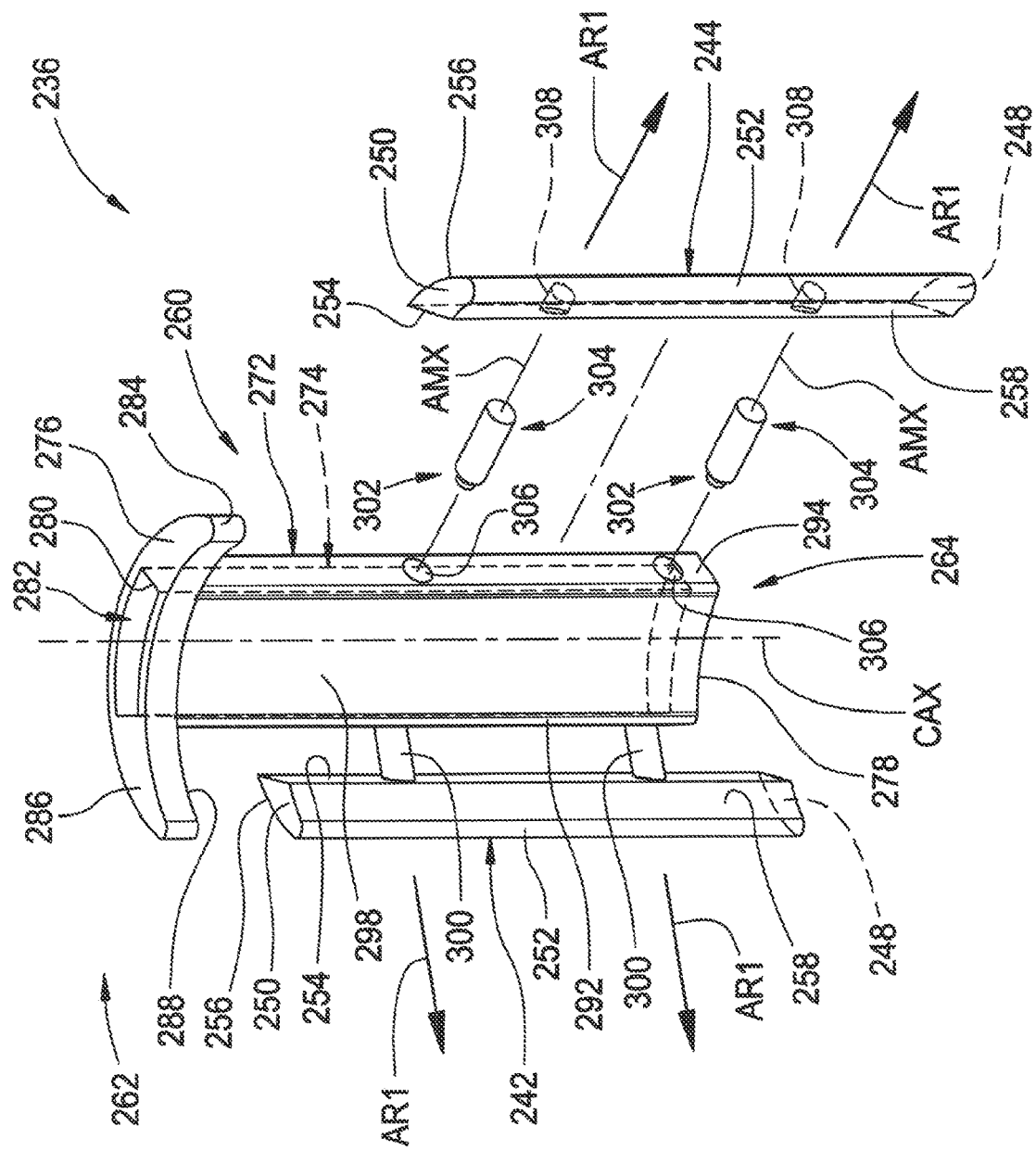
FIG. 10 is a partially-exploded top perspective view of an exemplary curing shoe assembly shown in FIGS. 5-9.

During use and operation, mold sections 202 and 204 are moved toward one another such that less-than-fully-cured non-pneumatic tire 100 is captured within mold cavity 214 and/or 218 in operative engagement with interstitial curing system 100. In such an arrangement, less-than-fully-cured non-pneumatic tire 100 is engaged coextensively with curing shoe assemblies 236 such that curing shoes 242 and 244 are disposed with corresponding spaces 154 between adjacent support structures 140, as described above. A quantity of fluid 318 (e.g., air, steam, water, oil) is disposed within fluid chamber 316 and cup chambers 274. As fluid pressure of fluid 318 increases, as is represented by arrows FLP in FIG. 9, actuation members 300 are displaced in an outward direction (e.g., along actuation member axis AMX). Such translation or other movement of actuation members 300 causes corresponding displacement of curing shoes 242 and 244 in an outward direction and/or otherwise toward an extended position, as is represented in FIGS. 9-11 by arrows AR1. As fluid pressure of fluid 318 is decreases, curing shoe assemblies 236 are de-actuated and curing shoes 242 and/or 244 can return to a retracted position. Additionally, or in the alternative, one or more springs or other biasing devices can, in some cases, be operatively connected with the actuation members and/or curing shoes to promote displacement from the extended position toward a retracted position.

As pressure is applied to less-than-fully-cured non-pneumatic tire 100 by curing shoe assemblies 236, a method in accordance with the subject matter of the present can also include applying heat to the less-than-fully-cured non-pneumatic tire. It will be appreciated that heat can be transferred into less-than-fully-cured non-pneumatic tire 100 in any suitable manner and/or through any suitable combination of heat transfer mechanisms and/or processes. As one example, mold assembly 200 can be communicatively coupled with heated fluid source HFS. In such case, heated fluid (e.g., air, steam, water) can be circulated into any suitable combination of passages and/or chambers of mold assembly 200. For example, mold assembly 200 and/or interstitial curing system 210 can include a heated-fluid distribution system 320 fluidically connected to heated fluid source HFS.

Heated-fluid distribution system 320 can include a base plate 322 that can be supported on or along mold section 202. Heated-fluid distribution system 320 can also include an inner side wall 324 and an outer side wall 326 that are supported on base plate 322 with the outer side wall spaced radially outward of the inner side wall. An end wall 328 can be supported on or along inner and/or outer side walls 324 and 326 to at least partially define a heated-fluid chamber 330. In such an arrangement, heated fluid can be transferred into and out of spaces 154 of structure body 108 through passages 332 of end wall 328, such as by way of conduits 208, for example. In some cases, shoe body wall 246 of curing shoes 242 and/or 244 can include heat-transfer passages 334 extending therethrough that can be disposed in fluid communication with heated-fluid distribution system 320.

Figure 12:
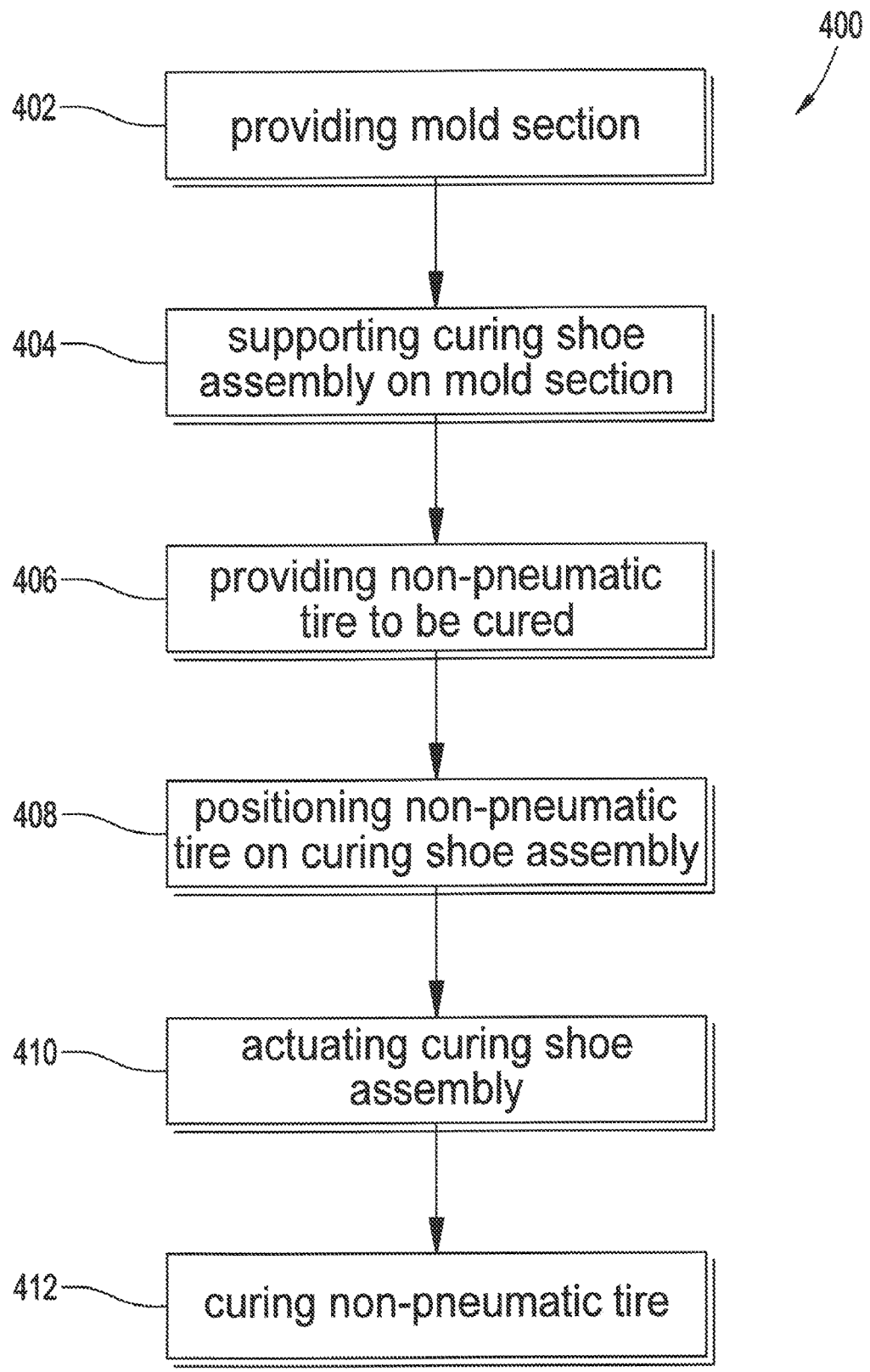
FIG. 12 is a graphical representation of one example of a method of manufacture in accordance with the subject matter of the present disclosure.

A method 400 of manufacturing in accordance with the subject matter of the present disclosure of manufacturing a non-pneumatic tire is shown in FIG. 12 can include providing a mold section having mold axis MAX, such as one of mold sections 202 and 204, for example, as is represented in FIG. 12 by reference number 402. Method 400 can also include supporting one or more curing shoe assemblies, such as curing shoe assemblies 236, for example, on the mold section in radially-offset relation to mold axis MAX, such as is represented in FIG. 12 by reference number 404. In a preferred arrangement, a plurality of curing shoe assemblies 236 will be disposed in spaced relation to one another about mold axis MAX to at least partially form interstitial curing system 210. Method 400 can further include providing less-than-fully-cured non-pneumatic tire 100 and positioning the less-than-fully-cured non-pneumatic tire on or along the mold section in an axially coextensive arrangement with the one or more curing bladder assemblies, such as is represented in FIG. 12 by reference numbers 406 and 408, respectively. Method 400 can also include actuating the one or more curing shoe assemblies and then curing the non-pneumatic tire, such as is represented in FIG. 12 by reference numbers 410 and 412, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus, it is to be distinctly understood claims directed to any such combination of features and/or components, whether or not specifically embodied herein, are intended to find support in the present disclosure. To aid the Patent Office and any readers of this application and any resulting patent in interpreting the claims appended hereto, Applicant does not intend any of the appended claims or any claim elements to invoke 35 U.S.C. 112(f) unless the words "means for" or "step for" are explicitly used in the particular claim.

While the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A method of manufacturing a non-pneumatic tire, said method comprising:
supporting a curing shoe assembly on a first mold section that has a longitudinally-extending mold axis with said curing shoe assembly including:
an actuation cup supported on said first mold section such that said actuation cup is disposed in radially-offset alignment with said mold axis, said actuation cup including a cup wall that at least partially defines a cup chamber;
a first actuation member extending between a first member end and a second member end, said first actuation member extending through and operatively supported on said cup wall such that said first member end thereof is disposed within said cup chamber and said first actuation member is translatable along a first member axis that is oriented transverse to said mold axis;
a second actuation member extending between a first member end and a second member end, said second actuation member extending through and operatively supported on said cup wall such that said first member end thereof is disposed within said cup chamber and said second actuation member is translatable in along a second member axis that is oriented transverse to said mold axis and disposed at an acute included angle relative to said first member axis;
a first curing shoe supported on said second end of said first actuation member; and,
a second curing shoe supported on said second end of said second actuation member in spaced relation to said first curing shoe;
providing a less-than-fully-cured non-pneumatic tire assembly that includes a plurality of support structures disposed in peripherally-spaced relation to one another and a plurality of spaces disposed in peripherally-spaced relation to one another with one of said plurality of spaces between adjacent ones of said plurality of support structures;
positioning said less-than-fully-cured non-pneumatic tire assembly along said first mold section such that said curing shoe assembly is disposed within one of said plurality of spaces and axially coextensive with said less-than-fully-cured non-pneumatic tire assembly;
applying fluid pressure to said first member end of said first actuation member and said first member end of said second actuation member thereby displacing said first and second curing shoes laterally away from said actuation cup and laterally away from one another into engagement with and applying pressure to said less-than-fully-cured non-pneumatic tire assembly; and,
curing said non-pneumatic tire assembly.

2. A method according to claim 1, wherein supporting said curing shoe assembly on said first mold section includes providing said cup wall with a first end wall portion that at least partially defines an open end of said actuation cup in fluid communication with said cup chamber and with a second end wall portion that at least partially defines a closed end of said actuation cup.

3. A method according to claim 1, wherein supporting said curing shoe assembly on said first mold section includes providing said cup wall with a first edge wall portion and a second edge wall portion that is spaced apart from said first edge wall portion such that said cup chamber is at least partially disposed therebetween, extending said first actuation member through said first edge wall portion, and extending said second actuation member through said second edge wall portion.

4. A method according to claim 3, wherein supporting said curing shoe assembly on said first mold section includes providing said cup wall with first and second end wall portions with said first and second edge wall portions extending axially from along said first end wall portion of said cup wall toward said second end wall portion of said cup wall.

5. A method according to claim 1, wherein supporting said curing shoe assembly on said first mold section includes providing said cup wall with a first side wall portion and a second side wall portion that is spaced apart from said first side wall portion such that said cup chamber is at least partially disposed therebetween.

6. A method according to claim 5, wherein supporting said curing shoe assembly on said first mold section includes providing said first side wall portion with a convex outer surface portion and said second side wall portion with a concave outer surface portion.

7. A method according to claim 1, wherein supporting said curing shoe assembly on said first mold section includes providing first and second side wall portions that extend axially from along a first end wall portion toward a second end wall portion and laterally from along a first edge wall portion toward a second edge wall portion.

8. A method according to claim 1, wherein supporting said curing shoe assembly on said first mold section includes supporting a plurality of curing shoe assemblies on said first mold section in peripherally-spaced relation to one another around said mold axis.

9. A method according to claim 1 further comprising providing said first mold section with a fluid distribution chamber and fluidically connecting said cup chamber of said curing shoe assembly with said fluid distribution chamber.

10. A method according to claim 9, wherein applying fluid pressure to said first member end of said first actuation member and said first member end of said second actuation member includes applying fluid pressure to said fluid distribution chamber thereby applying approximately uniform fluid pressure to said first member end of said first actuation member and said first member end of said second actuation member of said curing shoe assembly and approximately-simultaneously displacing said first and second curing shoes of said curing shoe assembly.

11. A method according to claim 1, wherein providing said less-than-fully-cured non-pneumatic tire assembly includes:
providing a first annular ring having a longitudinal axis, said first annular ring extending axially between a first first ring end and a second first ring end spaced axially from said first first ring end, said first annular ring including a first ring outer surface portion facing radially outward and disposed between said first first ring end and said second first ring end; and,
applying a first layer of less-than-fully-cured elastomeric material along at least said first ring outer surface portion of said first annular ring.

12. A method according to claim 11, wherein providing said less-than-fully-cured non-pneumatic tire assembly includes:
providing a second annular ring extending axially between a first second ring end and a second second ring end spaced axially from said first second ring end, said second annular ring including a second ring inner surface portion facing radially inward and disposed between said first second ring end and said second second ring end; and,
applying a second layer of less-than-fully-cured elastomeric material along at least said second ring inner surface portion of said second annular ring.

13. A method according to claim 12, wherein providing said less-than-fully-cured non-pneumatic tire assembly includes positioning said second annular ring concentrically and coextensively with said first annular ring.

14. A method according to claim 13, wherein providing said less-than-fully-cured non-pneumatic tire assembly includes providing each of said plurality of support structures with a first support structure edge, a second support structure edge opposite said first support structure edge, a first support structure end and a second support structure end opposite said first support structure end.

15. A method according to claim 14, wherein providing said less-than-fully-cured non-pneumatic tire assembly includes positioning said plurality of support structures in peripherally-spaced relation to one another about said longitudinal axis of said first annular ring such that said first support structure ends of said plurality of support structures are spaced apart from one another along said first layer of less-than-fully-cured elastomeric material and such that said second support structure ends of said plurality of support structures are spaced apart from one another along said second layer of less-than-fully-cured elastomeric material.

16. A mold assembly for curing non-pneumatic tires, said mold assembly comprising:
a first mold section having a longitudinally-extending mold axis;
a curing shoe assembly supported on said first mold section, said curing shoe assembly including:
an actuation cup supported on said first mold section such that said actuation cup is disposed in radially-offset alignment with said mold axis, said actuation cup including a cup wall that at least partially defines a cup chamber;
a first actuation member extending between a first member end and a second member end, said first actuation member extending through and operatively supported on said cup wall such that said first member end thereof is disposed within said cup chamber and said first actuation member is translatable along a first member axis that is oriented transverse to said mold axis;
a second actuation member extending between a first member end and a second member end, said second actuation member extending through and operatively supported on said cup wall such that said first member end thereof is disposed within said cup chamber and said second actuation member is translatable along a second member axis that is oriented transverse to said mold axis and disposed at an acute included angle relative to said first member axis;
a first curing shoe supported on said second member end of said first actuation member and a second curing shoe supported on said second member end of said second actuation member in spaced relation to said first curing shoe such that upon application of fluid pressure to said first ends of said first and second actuation members said first and second curing shoes are displaced laterally away from said actuation cup and laterally away from one another into engagement with an associated non-pneumatic tire.

17. A mold assembly according to claim 16, wherein said cup wall includes a first end wall portion that at least partially defines an open end of said actuation cup in fluid communication with said cup chamber, a second end wall portion that at least partially defines a closed end of said actuation cup, a first edge wall portion and a second edge wall portion that is spaced apart from said first edge wall portion, said first and second edge wall portions extending axially from along said first end wall portion toward said second end wall portion such that said cup chamber is at least partially disposed therebetween with said first actuation member extending through said first edge wall portion and said second actuation member extending through said second edge wall portion.

18. A mold assembly according to claim 17, wherein said cup wall includes a first side wall portion and a second side wall portion that is spaced apart from said first side wall portion such that said cup chamber is at least partially disposed therebetween.

19. A mold assembly according to claim 16, wherein said first mold section includes a fluid distribution chamber in fluid communication with said cup chamber of said curing shoe assembly.

20. A mold assembly according to claim 16, wherein said curing shoe assembly is one of a plurality of curing shoe assemblies disposed in peripherally-spaced relation to one another about said mold axis.

* * * * *